United States Patent
Fujisawa et al.

(10) Patent No.: US 7,595,645 B2
(45) Date of Patent: Sep. 29, 2009

(54) CALIBRATION CIRCUIT AND SEMICONDUCTOR DEVICE INCORPORATING THE SAME

(75) Inventors: Hiroki Fujisawa, Tokyo (JP); Hideyuki Yoko, Kodaira (JP)

(73) Assignee: Elpida Memory, Inc., Tolyo (JP)

( * ) Notice: Subject to any disclaimer, the term of this patent is extended or adjusted under 35 U.S.C. 154(b) by 263 days.

(21) Appl. No.: 11/580,902

(22) Filed: Oct. 16, 2006

(65) Prior Publication Data
US 2007/0143052 A1 Jun. 21, 2007

(30) Foreign Application Priority Data
Oct. 17, 2005 (JP) .............................. 2005-301717

(51) Int. Cl.
*G01R 35/00* (2006.01)
*H03K 19/094* (2006.01)
(52) U.S. Cl. .......................... 324/601; 702/107; 326/85
(58) Field of Classification Search ................. 324/601; 702/107; 326/30, 85, 87
See application file for complete search history.

(56) References Cited

U.S. PATENT DOCUMENTS 6,509,778 B2 * 1/2003 Braceras et al. ................ 326/87
6,927,600 B2 * 8/2005 Choe ............................ 326/30

FOREIGN PATENT DOCUMENTS

| JP | 7-142985 A | 6/1995 |
| JP | 11-27132 A | 1/1999 |
| JP | 2000-353941 A | 12/2000 |
| JP | 2005-65249 A | 3/2005 |

* cited by examiner

*Primary Examiner*—Timothy J Dole
(74) *Attorney, Agent, or Firm*—Sughrue Mion, PLLC

(57) ABSTRACT

Impedance adjusting transistors are once inactivated on every occasion of changing an impedance adjusting code. After restoring the potential to an initially set potential by once inactivating the impedance adjusting transistors, the state of the transistors is switched according to the impedance adjusting code. By starting the potential from the initially set potential at the time of switching the state of the transistors, no switching noise is generated. Since no switching noise is generated, a comparator always carries out stable comparison and judgment and thus there is obtained a calibration circuit that ensures stable outputs.

24 Claims, 5 Drawing Sheets

CALIBRATION CIRCUIT AND SEMICONDUCTOR DEVICE INCORPORATING THE SAME

This application claims priority to prior Japanese patent application JP 2005-301717, the disclosure of which is incorporated herein by reference.

BACKGROUND OF THE INVENTION

1. Field of the Invention

This invention relates to a semiconductor device and, in particular, relates to a calibration circuit adapted for adjusting impedance of an output circuit and to a semiconductor device incorporating such a calibration circuit.

2. Related Art

Recent electronic systems have been speeded up in operation, wherein the data transfer rate between semiconductor devices forming the system has been highly increased. In order to achieve such an ultra high-speed data transfer, a data signal is made to have a small amplitude and, further, the impedance of a transmission line between the semiconductor devices and the output impedance of an output circuit of each semiconductor device are matched together By matching the impedances, the small-amplitude data signal can be transmitted with no distortion to thereby achieve the speedup of the data transfer. If the impedance of the transmission line between the semiconductor devices and the output impedance of the semiconductor device are not matched, the data waveform becomes dull during transmission to cause overshoot or undershoot, thereby disabling the high-speed data transfer.

For matching the impedance of the transmission line and the output impedance of the output circuit that drives the transmission line, it is necessary that the output impedance of the semiconductor device be adjusted so as to match with the impedance of the transmission line. The output impedance of the semiconductor device is adjusted using a circuit normally called a calibration circuit. Such a calibration circuit is disclosed in Prior Document 1 (Japanese Unexamined Patent Application Publication (JP-A) No. Hei 07-142985), Prior Document 2 (Japanese Unexamined Patent Application Publication (JP-A) No. 2005-065249), and Prior Document 3 (Japanese Unexamined Patent Application Publication (JP-A) No. Hei 11-027132).

Prior Document 1 describes a calibration circuit comprising a reference resistance and a group of transistors and disposed between a supply voltage and a ground potential in the same manner as an output circuit. A technique is disclosed for reducing noise that is generated at the time of switching the state of the group of transistors in this calibration circuit. The calibration circuit controls the on/off states of the respective transistors on the basis of an output of a comparison circuit as a result of comparison between an output voltage and a reference voltage. The group of transistors is comprised of a group of large transistors having the same large driving capability and a group of small transistors having small driving capabilities that differ from one another.

The group of small transistors has the driving capability proportional to the binary system and switches the on/off states of the transistors one by one according to a binary counter signal. The group of large transistors is designed to reduce noise generated at the time of switching the state of the group of transistors by suppressing one-by-one switching of the on/off states of the transistors by the use of the decimal system. However, although the noise is reduced at the time of switching the state of the group of large transistors, the noise is still generated. Further, since the number of transistors that should be individually driven increases due to the decimal system, there arises a new problem that the number of driver circuits increases.

Prior Document 2 discloses a technique that the impedance is controlled by comparing an output voltage with a reference voltage and producing an impedance control code by the use of a counter, thereby controlling the on/off states of transistors. Prior Document 3 discloses an impedance matching circuit comprising pull-up/pull-down transistors and a counter circuit that performs counting according to the result of a comparison circuit. In the impedance matching circuit, the count result of the counter circuit is input into the gates of the transistors to thereby control the impedance of the transistors. However, the foregoing documents each still have a problem that noise is generated at the time of switching the on/off states of the transistors.

FIG. 1 exemplarily shows the noise generated at the time of switching the on/off states of the transistors. For example, assuming that a calibration circuit is comprised of five transistors, the current driving capabilities of these five transistors are configured to have a ratio of 16:8:4:2:1. By setting the current driving capabilities of the transistors to the ratio in accordance with the binary system in this manner, the transistors can be controlled corresponding to respective bits of a control signal. When the control signal changes from 01111 (binary notation) to 10000 (binary notation) and the most significant bit is input earlier than the other four bits, the total current driving capability of the calibration circuit changes as 15→31→16 (decimal notation) (hereinafter, signals will be expressed in binary notation while others in decimal notation).

In this manner, during the transition period when the control signal is shifted in level, there is a large change in current driving capability and thus a large change in potential occurs as noise. Conversely, when the control signal changes from 10000 to 01111 and the most significant bit is input later than the other four bits, the total current driving capability of the calibration circuit changes as 16→31→15. In this manner, during the transition period when the control signal is shifted in level, there is a large change in current driving capability and thus a large change in potential occurs as noise. Accordingly, as shown in FIG. 1, there is a problem that large noise occurs during transition periods when the control signal is shifted in level, thereby disabling accurate calibration.

In terms of removal of noise, there; is Prior Document 4 (Japanese Unexamined Patent Application Publication (JP-A) No. 2000-353941). Prior Document 4 describes producing a first sample and hold signal, a second sample and hold signal subsequent thereto, and a third sample and hold signal obtained by delaying the first sample and hold signal. The influence of noise is reduced by changing the level of the third sampling signal at a latter half of a hold interval thereof to the level of the second sampling signal by the use of level changing means.

As described above, the calibration circuit switches the on/off states of the transistors on the basis of the control signal, thereby matching the impedances. Therefore, there is the problem that the noise is generated at the time of switching the state of the transistors, thus disabling accurate calibration.

SUMMARY OF THE INVENTION

In view of the foregoing problem, this invention is configured such that when the state of transistors is switched, all the transistors are once inactivated so as to be returned to initial setting and then the state of the transistors is set to desired setting, thereby adjusting the impedance. With this configuration, there is provided a calibration circuit wherein since the potential level is shifted from a constant level (initial setting level), a comparator always carries out stable comparison and judgment without being affected by noise at the time of switching the state of the transistors, thereby obtaining stable outputs and there is further provided a semiconductor device incorporating such a calibration circuit.

For accomplishing the foregoing, this invention basically employs techniques described below. It goes without saying that applied techniques changeable in various ways without departing from the technical principle of this invention are also included in this application.

A calibration circuit of this invention comprises a replica circuit connected to a calibration terminal, a comparator adapted to compare between a potential at the calibration terminal and a reference potential, a counter adapted to perform a count operation in response to an output of the comparator, and a control circuit adapted to output an impedance control signal in response to a count output and a mask signal from the counter, the impedance control signal used for controlling impedance of the replica circuit, wherein the impedance control signal is set to an initial state by the mask signal when the count output changes.

In the calibration circuit of this invention, the replica circuit comprises a plurality of transistors connected in parallel with each other and the plurality of transistors are input with the impedance control signal at their gates so as to be turned on or off, respectively, thereby controlling the impedance of the replica circuit.

In the calibration circuit of this invention, the replica circuit has substantially the same structure as that on a load side at a final stage of an output circuit and is interposed between the calibration terminal and a supply potential.

In the calibration circuit of this invention, the replica circuit has substantially the same structure as that on a driver side at a final stage of an output circuit and is interposed between the calibration terminal and a ground potential.

A calibration circuit of this invention comprises a pull-up circuit connected between a supply potential and a calibration terminal, a comparator adapted to compare between a potential at the calibration terminal and a reference potential, a counter adapted to perform a count operation in response to an output of the comparator, and a control circuit adapted to output an impedance control signal in response to a count output and a mask signal from the counter, the impedance control signal used for controlling impedance of the pull-up circuit, wherein the impedance control signal is set to an initial state by the mask signal when the count output changes.

The calibration circuit of this invention further comprises a second pull-up circuit, a pull-down circuit, a second comparator adapted to compare between a potential, at a contact point between the second pull-up circuit and the pull-down circuit, and the reference potential, a second counter adapted to perform a count operation in response to an output of the second comparator, and a second control circuit adapted to output a second impedance control signal in response to a second count output and a second mask signal from the second counter, the second impedance control signal used for controlling impedance of the pull-down circuit, wherein the second impedance control signal is set to an initial state by the second mask signal when the second count output changes.

In the calibration circuit of this invention, the pull-up circuit has substantially the same structure as that on a load side at a final stage of an output circuit and is interposed between the calibration terminal and the supply potential.

In the calibration circuit of this invention, the second pull-up circuit has substantially the same structure as that on a load side at a final stage of an output circuit and is interposed between one end of the pull-down circuit and the supply potential.

In the calibration circuit of this invention, the pull-down circuit has substantially the same structure as that on a driver side at a final stage of an output circuit and is interposed between one end of the second pull-up circuit and a ground potential.

A semiconductor device of this invention comprises any one of the calibration circuits as described above.

A calibration circuit control method of this invention comprises the steps of judging a potential difference between a potential, at a contact point between a first circuit and a replica circuit, and a reference potential and producing a count command signal requiring a count operation; counting in response to the count command signal and outputting a count number; and adjusting impedance of the replica circuit according to the count number, wherein the step of outputting the count number outputs an initially set value as the count number during a period when the count number changes.

In the calibration circuit control method of this invention, the first circuit is a resistor and the replica circuit has substantially the same structure as that on a load side at a final stage of an output circuit, thereby causing impedance on the load side at the final stage of the output circuit to be equal to impedance of the resistor.

The calibration circuit control method of this invention further comprises the steps of inputting the count number into a second replica circuit and fixing impedance thereof; judging a potential difference between a potential, at a contact point between the second replica circuit and a third replica circuit, and the reference potential and producing a second count command signal requiring a count operation; counting in response to the second count command signal and outputting a second count number; and adjusting impedance of the third. replica circuit according to the second count number, wherein the step of outputting the second count number outputs an initially set value as the second count number during a period when the second count number changes.

In the calibration circuit control method of this invention, the second replica circuit has substantially the same structure as that on the load side at the final stage of the output circuit and the third replica circuit has substantially the same structure as that on a driver side at the final stage of the output circuit, thereby causing each of the impedance of the second replica circuit and the impedance of the third replica circuit to be equal to the impedance of the resistor.

ADVANTAGEOUS EFFECT OF THE INVENTION

The calibration operation of this invention adjusts the impedance after once inactivating transistors of a replica buffer. The impedance adjustment can be realized by configuring such that the level at a calibration pin ZQ and the level at a replica contact point A reach a predetermined potential (VDD/2) after returning to a ground level and a VDD level, respectively, which are each a constant level. Therefore, it is possible to provide stable output levels at the calibration pin ZQ and the contact point A without being subjected to replica buffer transistor switching noise, thereby achieving an effect that comparators can always carry out stable comparison and judgment.

DESCRIPTION OF THE PREFERRED EMBODIMENT

Figure 1:
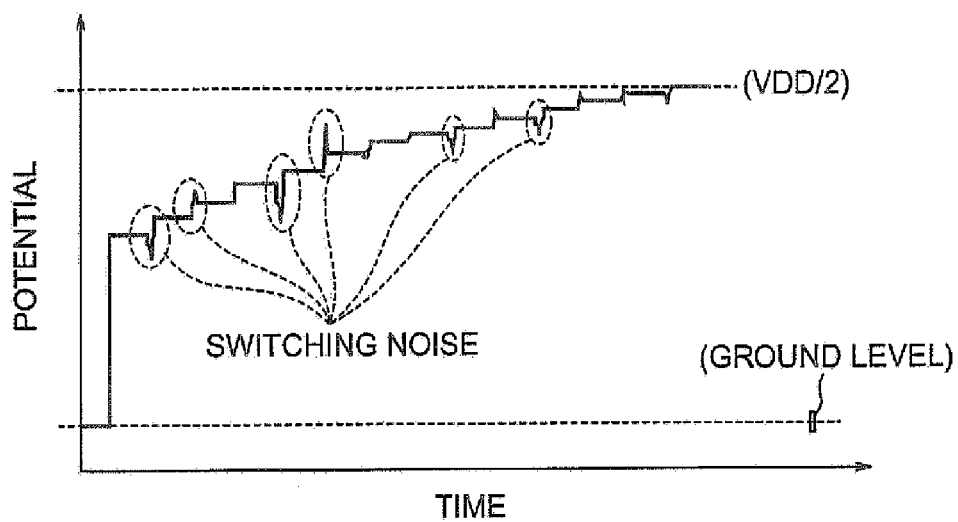
FIG. 1 is an exemplary diagram of noise generated at the time of switching the on/off states of transistors according to a conventional example.
Figure 2:
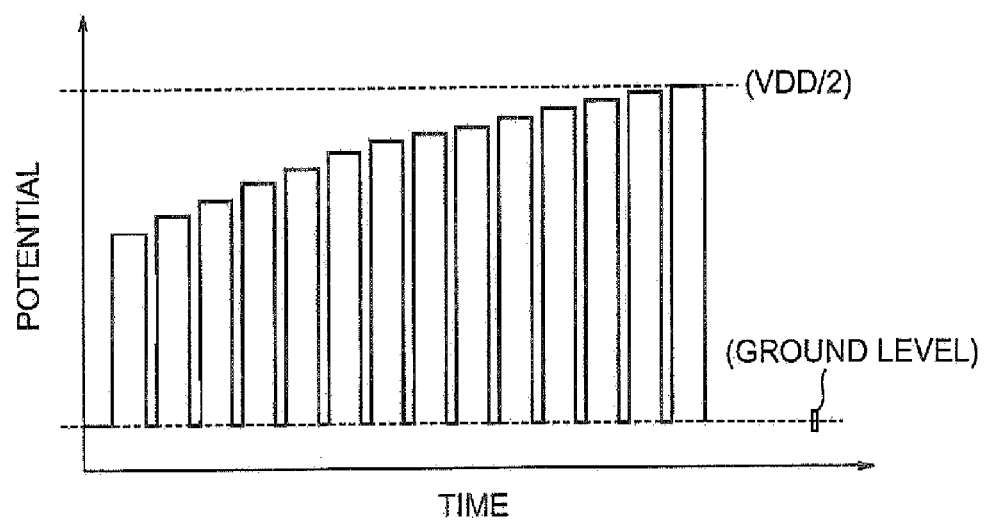
FIG. 2 is a diagram showing changes in potential at a calibration contact point in calibration operation according to this invention.
Figure 3:
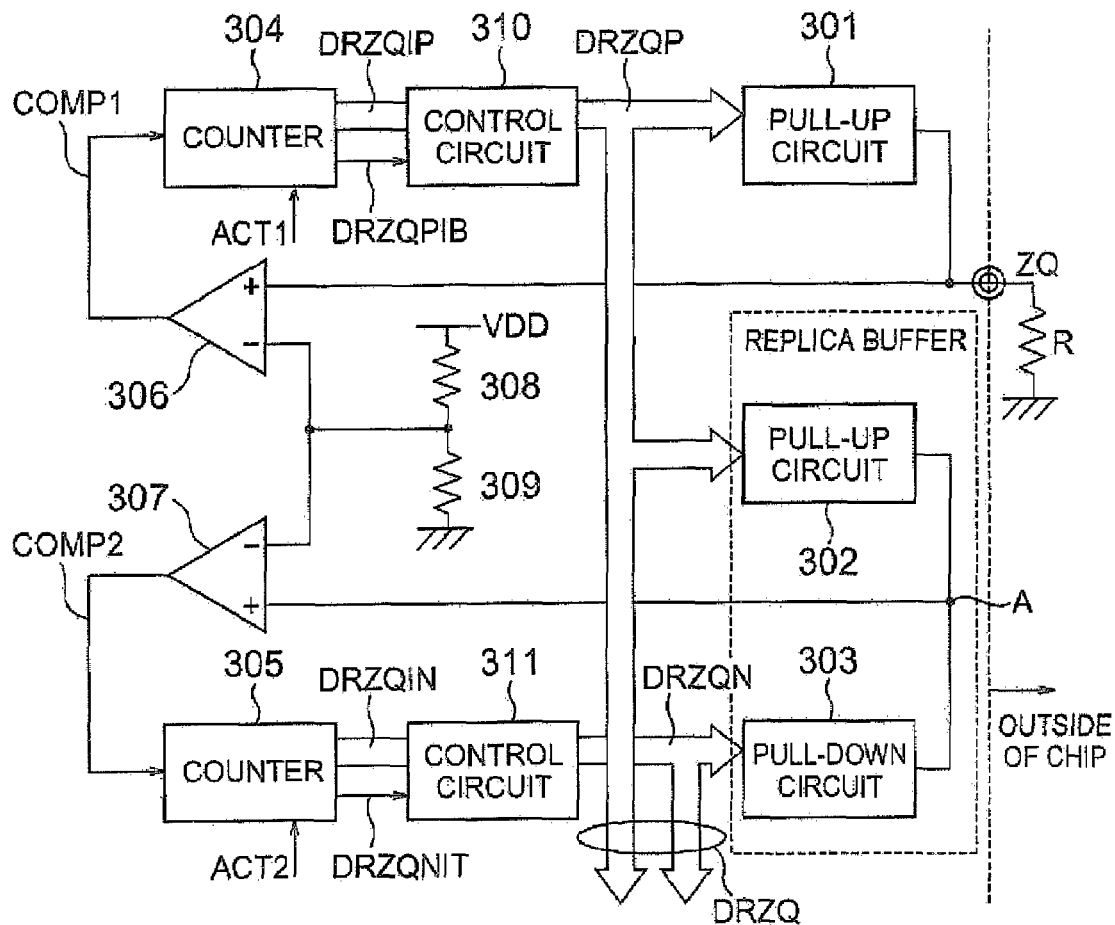
FIG. 3 is a calibration circuit diagram.
Figure 4:
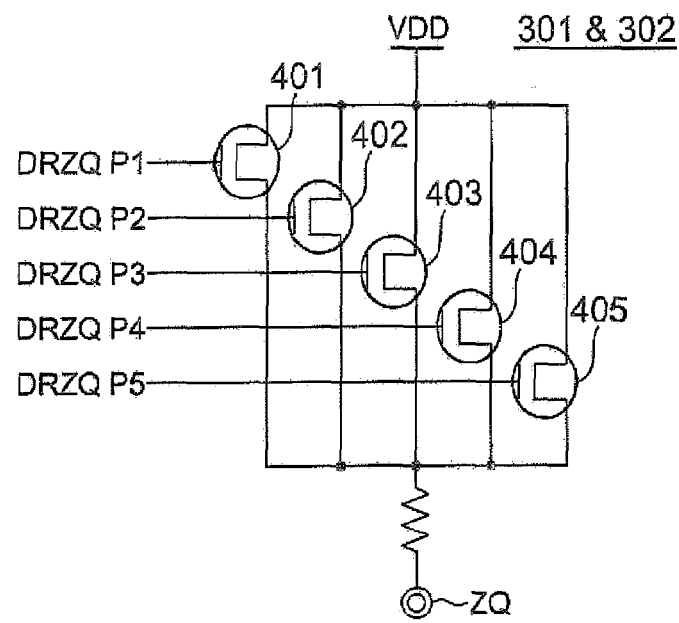
FIG. 4 is a pull-up circuit diagram.
Figure 5:
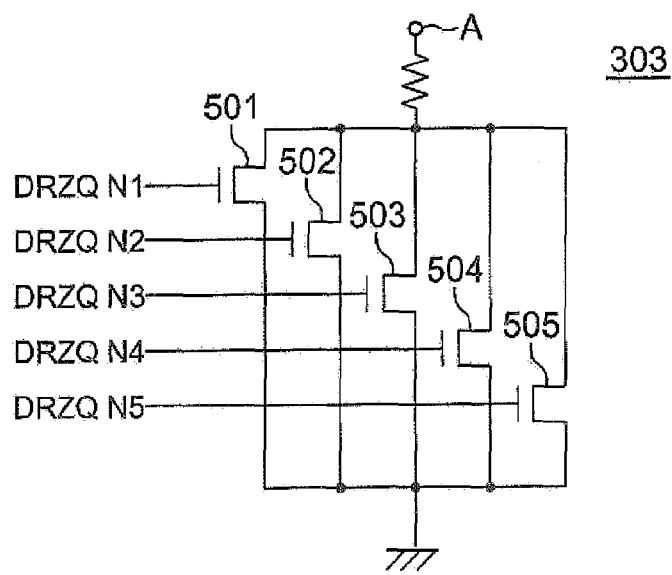
FIG. 5 is a pull-down circuit diagram.
Figure 6:
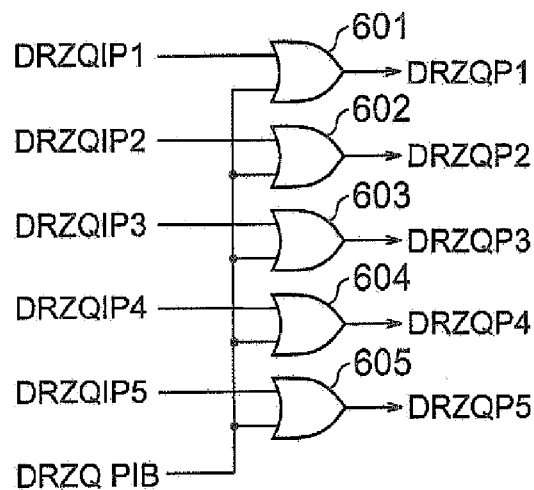
FIG. 6 is a pull-up control circuit diagram.
Figure 7:
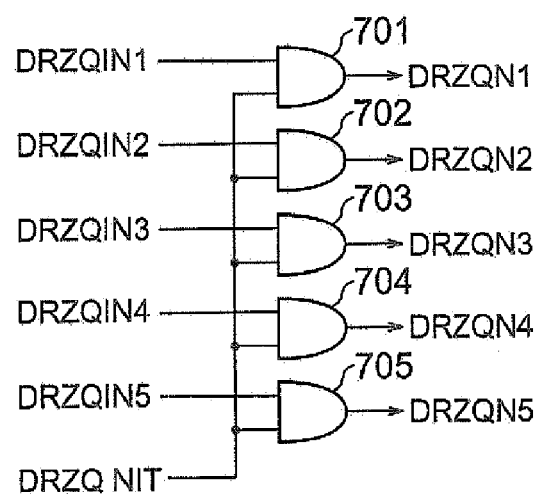
FIG. 7 is a pull-down control circuit diagram.
Figure 8:
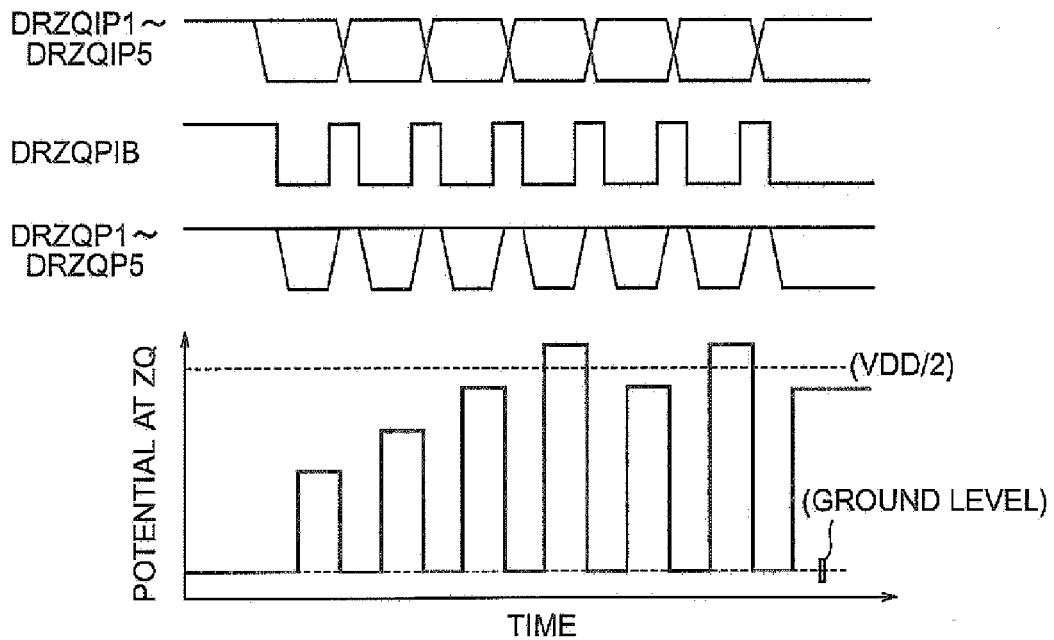
FIG. 8 is a timing chart of calibration operation on the pull-up circuit side.
Figure 9:
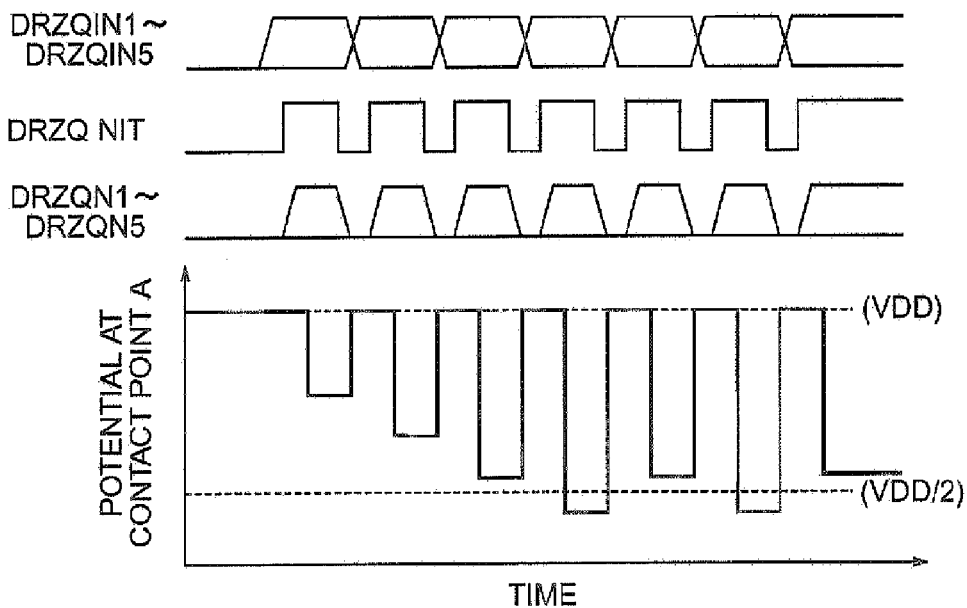
FIG. 9 is a timing chart of calibration operation on the pull-down circuit side.

The best mode of this invention will be described in detail with reference to FIGS. 2 to 9. FIG. 2 shows calibration potential changes in calibration operation according to this invention. The calibration operation of this invention is characterized in that the potential is once returned to an initially set potential and then set to a desired setting potential. FIG. 2 is a diagram showing changes in potential at a calibration contact point in the calibration operation according to this invention. FIG. 3 is a calibration circuit diagram, FIG. 4 is a pull-up circuit diagram, FIG. 5 is a pull-down circuit diagram, FIG. 6 is a pull-up control circuit diagram, and FIG. 7 is a pull-down control circuit diagram. FIG. 8 is a timing chart of calibration operation on the pull-up circuit side and FIG. 9 is a timing chart of calibration operation on the pull-down circuit side.

A calibration circuit shown in FIG. 3 is incorporated in a semiconductor device and comprises pull-up circuits 301 and 302, a pull-down circuit 303, counters 304 and 305, comparators 306 and 307, resistors 308 and 309, and control circuits 310 and 311. Impedance control signals DRZQ (DRZQP1 to DRZQP5 and DRZQN1 to DRZQN5) from this calibration circuit are also supplied to an output circuit. The impedance control signal DRZQP (DRZQP1 to DRZQP5) is used as a gate signal for transistors forming a final-stage load side of the output circuit. The impedance control signal DRZQN (DRZQN1 to DRZQN5) is used as a gate signal for transistors forming a final-stage driver side of the output circuit. The impedance control signals DRZQP and DRZQN serve to set the impedances on the load side and the driver side of the output circuit to optimal values, respectively.

A calibration pin ZQ of the semiconductor device is connected to a ground potential GND through an external resistor R. The pull-up circuit 301 is provided between the calibration pin ZQ and a supply potential VDD. Therefore, the calibration pin ZQ is connected to the supply potential VDD through the pull-up circuit 301 and to the ground potential GND through the external resistor R. By adjusting the potential at the calibration pin ZQ to half the supply potential, i.e. VDD/2, the impedance of the pull-up circuit 301 is made equal to that of the external resistor R. The resistors 308 and 309 are connected in series between the supply potential VDD and the ground potential GND to form a reference potential generating circuit that outputs a reference potential Vref from a connection point between the two resistors 308 and 309. Herein, the reference potential Vref is, for example, VDD/2.

The comparator 306 compares between the input potential at the calibration pin ZQ and the input reference potential Vref and outputs an output COMP1. On the basis of the output COMP1 of the comparator 306 and an act signal ACT1, the counter 304 starts a count operation. Herein, for example, the counter 304 is initially set to (11111) (all in high level) and performs a count-down operation in response to a low level of the output COMP1 and a count-up operation in response to a high level of the output COMP1. The counter 304 outputs least to most significant bit signals DRZQIP1 to DRZQIP5. Further, the counter 304 outputs an inverted mask signal DRZQPIB for masking the timing at which the counter signal changes.

The control circuit 310 is input with the least to most significant bit signals DRZQIP1 to DRZQIP5 and the inverted mask signal DRZQPIB and outputs impedance control signals DRZQP1 to DRZQP5. The pull-up circuits 301 and 302 are each input with the impedance control signals DRZQP1 to DRZQP5 and each adjust the impedance by setting transistors, corresponding to the respective bits, to the on/off states according to the input impedance control signals DRZQP1 to DRZQP5.

The pull-up circuit 302 is provided between the supply potential VDD and a contact point A and the pull-down circuit 303 is provided between the contact point A and the ground potential GND, thereby forming a replica buffer. The potential at the contact point A and the reference potential Vref are input into the comparator 307 where a comparison is made therebetween. On the basis of an output COMP2 of the comparator 307 and an act signal ACT2, the counter 305 starts a count operation. Herein, for example, the counter 305 is initially set to (00000) (all in low level) and performs a count-down operation in response to a low level of the output COMP2 and a count-up operation in response to a high level of the output COMP2. The counter 305 outputs least to most significant bit signals DRZQIN1 to DRZQIN5. Further, the counter 305 outputs a mask signal DRZQNIT for masking the timing at which the counter signal changes.

The control circuit 311 is input with the least to most significant bit signals DRZQIN1 to DRZQIN5 and the mask signal DRZQNIT and outputs impedance control signals DRZQN1 to DRZQN5. The pull-down circuit 303 is input with the impedance control signals DRZQN1 to DRZQN5 and adjusts the impedance by setting transistors, corresponding to the respective bits, to the on/off states according to the input impedance control signals DRZQN1 to DRZQN5.

Referring to FIG. 4, the pull-up circuits 301 and 302 will be described in detail. Since the pull-up circuits 301 and 302 have the same structure, description will be made of the pull-up circuit 301. The pull-up circuit 301 comprises a plurality of (five in FIG. 4) p-channel transistors 401 to 405 and a resistor Rp. The sources of the p-channel transistors 401 to 405 are commonly connected to the supply potential VDD while the drains of them are commonly connected to one end of the resistor Rp. Further, the other end of the resistor Rp is connected to the calibration pin ZQ. The gates of the p-channel transistors 401 to 405 are input with the corresponding impedance control signals DRZQP1 to DRZQP5, respectively. Since the impedance control signal DRZQP has the binary bit configuration, the sizes of the corresponding transistors also have values according to the binary system.

For example, assuming that the size of the transistor 401 is W/L, the size of the transistor 402 is set to 2 W/L, the size of the transistor 403 is set to 4 W/L, the size of the transistor 404 is set to 8 W/L, and the size of the transistor 405 is set to 16 W/L, i.e. the size is set to $2^{(n-1)}$ with respect to that of the transistor 401. That is, the impedance ratio of the transistors is set so as to satisfy $2^{(n-1)}$. The other end of the resistor Rp is connected to the calibration pin ZQ and the pull-up circuit 301 functions to rise (pull up) the potential at the calibration pin ZQ toward the supply potential.

The pull-up circuits 301 and 302 have the same structure as that on the load side at the final stage of the output circuit and are replica circuits of the load side at the final stage of the output circuit. Further, the pull-down circuit 303, which will be described later, has the same structure as that on the driver side at the final stage of the output circuit and is a replica circuit of the driver side at the final stage of the output circuit. Therefore, the pull-up circuits 301 and 302 and the pull-down circuit 303 are simply called replica circuits, respectively, while a buffer comprised of the pull-up circuit 302 and the pull-down circuit 303.is called a replica buffer of the output circuit. Herein, since the pull-up circuits 301 and 302 and the pull-down circuit 303 are the replica circuits of the output circuit, respectively, it is preferable that they have the same structures as those of the output circuit. However, they do not necessarily have completely the same structures, but may have substantially the same structures. Herein, "substantially the same" represents that the size may be shrunk and voltage-current characteristics are equivalent.

Referring to FIG. 5, the pull-down circuit 303 will be described in detail. The pull-down circuit 303 comprises a plurality of (five in FIG. 5) n-channel transistors 501 to 505 and a resistor Rn. The sources of the n-channel transistors 501 to 505 are commonly connected to the ground potential GND while the drains of them are commonly connected to one end of the resistor Rn. Further, the other end of the resistor Rn is connected to the contact point A. The gates of the n-channel transistors 501 to 505 are input with the corresponding impedance control signals DRZQN1 to DRZQN5, respectively. Since the impedance control signal DRZQN has the binary bit configuration, the sizes of the corresponding transistors also have values according to the binary system.

For example, assuming that the size of the transistor 601 is W/L, the size of the transistor 502 is set to 2 W/L, the size of the transistor 503 is set to 4 W/L, the size of the transistor 504 is set to 8 W/L, and the size of the transistor 505 is set to 16 W/L, i.e. the size is set to $2^{(n-1)}$ with respect to that of the transistor 501. That is, the impedance ratio of the transistors is set so as to satisfy $2^{(n-1)}$. The other end of the resistor Rn is connected to the contact point A and the pull-down circuit 303 functions to reduce (pull down) the potential at the contact point A toward the ground potential.

Referring to FIG. 6, the control circuit 310 will be described in detail. The control circuit 310 comprises five OR circuits 601 to 605. The inverted mask signal DRZQPIB is commonly input into the OR circuits 601 to 605 from the counter 304 and the bit signals DRZQIP1 to DRZQIP5 are input into the OR circuits 601 to 605, respectively, from the counter 304. The OR circuits 601 to 605 output the impedance control signals DRZQP1 to DRZQP5, respectively. As shown in FIG. 4, the impedance control signals DRZQP1 to DRZQP5 fed to the pull-up circuits 301 and 302 control the p-channel transistors 401 to 405 corresponding to the respective bits thereof.

When the inverted mask signal DRZQPIB is high, all the impedance control signals DRZQP1 to DRZQP5 become high. Accordingly, all the transistors 401 to 405 turn off, which is the same as the initial setting condition. When the inverted mask signal DRZQPIB is low, the impedance control signals DRZQP1 to DRZQP5 become equal to the corresponding bit signals DRZQIP1 to DRZQIP5, respectively.

The transistors 401 to 405 turn on/off in response to the impedance control signals DRZQP1 to DRZQP5 input to the respective gates thereof.

Referring to FIG. 7, the control circuit 311 will be described in detail. The control circuit 311 comprises five AND circuits 701 to 705. The mask signal DRZQNIT is commonly input into the AND circuits 701 to 705 from the counter 305 and the bit signals DRZQIN1 to DRZQIN5 are input into the AND circuits 701 to 705, respectively, from the counter 305. The AND circuits 701 to 705 output the impedance control signals DRZQN1 to DRZQN5, respectively. As shown in FIG. 5, the impedance control signals DRZQN1 to DRZQN5 fed to the pull-down circuit 303 control the n-channel transistors 501 to 505 corresponding to the respective bits thereof.

When the mask signal DRZQNIT is low, all the impedance control signals DRZQN1 to DRZQN5 become low. Accordingly, all the transistors 501 to 505 turn off, which is the same as the initial setting condition. When the mask signal DRZQNIT is high, the impedance control signals DRZQN1 to DRZQN5 become equal to the corresponding bit signals DRZQIN1 to DRZQIN5, respectively. The transistors 501 to 505 turn on/off in response to the impedance control signals DRZQN1 to DRZQN5 input to the respective gates thereof.

Referring now to the timing charts of FIGS. 8 and 9, the calibration operation of this invention will be described. FIG. 8 shows the timing chart during the impedance adjusting operation on the pull-up side connected to the calibration pin ZQ, wherein the act signal ACT1 is activated. The timing chart shows the bit signals DRZQIP1 to DRZQIP5 and the inverted mask signal DRZQPIB from the counter 304, the impedance control signals DRZQP1 to DRZQP5 from the control circuit 310, and the potential at the calibration pin ZQ. FIG. 9 shows the timing chart during the impedance adjusting operation on the pull-down side, wherein the act signal ACT2 is activated. The timing chart shows the bit signals DRZQIN1 to DRZQIN5 and the mask signal DRZQNIT from the counter 305, the impedance control signals DRZQN1 to DRZQN5 from the control circuit 311, and the potential at the contact point A.

The calibration operation is such that a replica circuit of an output circuit is provided and a control signal for optimizing the impedance of the replica circuit is produced. By the use of this optimal control signal, the impedance of the output circuit is optimally adjusted. Therefore, the calibration operation is carried out at the time of setting, such as at power-on or upon resetting. For more accurate setting, it is preferable to periodically carry out the calibration operation even during actual operation. As shown in FIG. 3, the calibration operation is carried out in the state where the external resistor R is externally connected to the calibration pin ZQ. For this external resistor R, it is necessary to use a predetermined resistance value of the output circuit. Using the thus obtained impedance control signals DRZQP1 to DRZQP5 and DRZQN1 to DRZQN5 as gate control signals of the respective transistors of the output circuit, the impedance of the output circuit is adjusted to an optimal value.

The calibration operation is started in response to an external command requiring the calibration operation. Then, the act signal ACT1 is activated to start the count operation of the counter 304. In this event, the act signal ACT2 is in an inactive state. As shown in FIG. 8, it is given that, as the initial state of the counter 304, the bit signals DRZQIP1 to DRZQIP5 are all high (11111) and the inverted mask signal DRZQPIB is high, and thus all the transistors of the pull-up circuit 301 are set to the off state. Since the potential at the calibration pin ZQ is equal to the ground potential GND and thus is lower than the reference potential Vref, the output COMP1 of the comparator 306 becomes low, so that the counter 304 counts down and outputs (11110).

The bit signal DRZQIP (11110) and the inverted mask signal DRZQPIB from the counter 304 are input into the control circuit 310. During the transition period when the bit signal DRZQIP changes from (11111) to (11110), the inverted mask signal DRZQPIB is held high. In this high-level period, all the transistors of the pull-up circuit 301 are in the off state and therefore the potential at the calibration pin ZQ is equal to the ground potential GND as in the initial state. The inverted mask signal DRZQPIB is set to low level after the bit signal DRZQIP has been changed, so that the bit signal DRZQIP (11110) is output as an impedance control signal DRZQP (11110) from the control circuit 310. The transistors of the pull-up circuit 301 turn on/off according to the impedance control signal DRZQP (11110), thereby determining the potential at the calibration pin ZQ.

In response to the impedance control signal DRZQP (11110), the transistors 401 of the pull-up circuits 301 and 302 are set to the on state while the transistors 402, 403, 404, and 405 are set to the off state. Since the size of the transistor 401 is W/L as the minimal unit and thus provides only a small driving capability, the potential at the calibration pin ZQ becomes slightly higher than the ground potential GND. However, since it is still lower than the reference potential Vref, the output COMP1 of the comparator 306 is held low and, therefore, the counter 304 further counts down and outputs (11101).

The bit signal DRZQIP (11101) and the inverted mask signal DRZQPIB from the counter 304 are input into the control circuit 310. During the transition period when the bit signal DRZQIP changes from (11110) to (11101), the inverted mask signal DRZQPIB is set to high level. In this high-level period, all the transistors of the pull-up circuit 301 are in the off state and therefore the potential at the calibration pin ZQ is once returned to the ground potential GND (i.e. restored to the initial setting). Then, the inverted mask signal DRZQPIB is set to low level, so that the bit signal DRZQIP (11101) is output as an impedance control signal DRZQP (11101) from the control circuit 310.

The time during which the inverted mask signal DRZQPIB is held high can be optionally determined, but should be long enough to cancel noise that would otherwise be generated due to the shift in level of the bit signals DRZQIP1 to DRZQIP5. The cycle of the inverted mask signal DRZQPIB is the same as the cycle in which the bit signals DRZQIP1 to DRZQIP5 are shifted in level. That is, the cycle of the inverted mask signal DRZQPIB is synchronized with the cycle of the count operation, i.e. the count-up operation or the count-down operation.

The transistors 402 of the pull-up circuits 301 and 302 input with the impedance control signal DRZQP (11101) are set to the on state while the transistors 401, 403, 404, and 405 are set to the off state. The size of the transistor 402 is 2 W/L and, therefore, the potential at the calibration pin ZQ becomes higher than that in the state of the bit signal DRZQIP (11110), but is lower than the reference potential Vref. Accordingly, the output COMP1 of the comparator 306 is held low and, therefore, the counter 304 further counts down and outputs a bit signal DRZQIP (11100).

By repeating these operations in sequence, the counter 304 continues counting down and, thus, the transistors of the pull-up circuit 301 turn on in order according to a count number so as to increase the total driving capability of the transistors of the pull-up circuit 301. As shown in FIG. 8, as the count operation proceeds, the impedance of the pull-up circuit 301 gradually decreases and hence the potential at the calibration pin ZQ gradually increases while once dropping to the ground level on every occurrence of the count operation.

As described above, according to this invention, the state of the transistors is set to the initial setting by the use of the inverted mask signal during the transition period when a count number outputted from the counter changes. For example, when a bit signal indicative of a count number changes from (10000) to (01111), the total current driving capability of the transistors changes from 16, through the state where all the transistors once turn off, then to the set value. That is, the total current driving capability of the transistors changes as 16→0→15. In the conventional example, the total current driving capability of the transistors changes over the wide range from 16→0→15 to 16→31→15 depending on the timing of constituent bit signals corresponding to the respective bits. Accordingly, noise generated at the time of the shift in level also changes over the wide range from 16→0→15 to 16→31→15.

In this invention, noise generated at the time of the shift in level always changes as 0→N assuming that the current driving capability after the shift in level is set to N. As a result, (1) by once turning off the transistors, the potential always changes in one direction rising from the initially set potential, and further, (2) the set impedance of the transistors becomes greater than or approximately equal to that of the external resistor. Therefore, overshoot cannot occur by overcoming the impedance of the external resistor. For the same reason, undershoot cannot occur in the pull-down circuit which will be described later. Consequently, the comparators can output accurate comparison results.

When, by further repeating counting down, the current driving capability of the transistors increases and the potential at the calibration pin ZQ exceeds the reference potential Vref, the output of the comparator 306 becomes high and hence the counter 304 counts up. In this manner, depending on magnitudes of the potential at the calibration pin ZQ and the reference potential Vref, the output of the comparator 306 becomes low or high and thus the counter 304 counts down or up. As a result, the potential at the calibration pin ZQ is stabilized around the reference potential Vref (=VDD/2).

When the potential at the calibration pin ZQ is stabilized around the reference potential Vref (=VDD/2), the act signal ACT1 is inactivated. In response to the inactivation of the act signal ACT1, the counter 304 stops its count operation and fixes its count value. Further, since the levels of the impedance control signals DRZQP1 to DRZQP5 are finalized, the impedance adjustment of the pull-up circuits is completed and fixed. In this event, the impedance of each of the pull-up circuits 301 and 302 is fixed so as to be equal to that of the external resistor R. In the state where the pull-up circuits are fixed, the act signal ACT2 is activated and the impedance adjustment of the pull-down circuit is carried out next.

FIG. 9 is the timing chart showing the impedance adjusting operation on the pull-down side connected to the contact point A, wherein the act signal ACT1 is inactivated while the act signal ACT2 is activated. The timing chart shows the bit signals DRZQIN1 to DRZQIN5 and the mask signal DRZQNIT from the counter 305, the impedance control signals DRZQN1 to DRZQN5 from the control circuit 311, and the potential at the contact point A. In this event, the pull-up circuit 302 is fixed to the optimal impedance as described above.

When the calibration operation of the pull-up circuit 301 has been finished, the act signal ACT2 is activated to start the count operation of the counter 305. As shown in FIG. 9, it is given that, as the initial state of the counter 305, the bit signals DRZQIN1 to DRZQIN5 are all low (00000) and the mask signal DRZQNIT is low, and thus all the transistors of the pull-down circuit 303 are set to the off state. Therefore, the potential at the contact point A is equal to the supply potential VDD and thus the output COMP2 of the comparator 307 becomes high, so that the counter 305 counts up and outputs a bit signal DRZQIN (00001).

The bit signal DRZQIN (00001) and the mask signal DRZQNIT from the counter 305 are input into the control circuit 311. During the transition period when the bit signal DRZQIN changes from (00000) to (00001), the mask signal DRZQNIT is held low and thus the impedance control signals DRZQN1 to DRZQN5 all become low. Therefore, in this low-level period, all the transistors of the pull-down circuit 303 are in the off state and hence the potential at the contact point A is equal to the supply potential VDD as in the initial state. Then, the mask signal DRZQNIT is set to high level, so that the bit signal DRZQIN (00001) is output as an impedance control signal DRZQN (00001) from the control circuit 311. The transistors of the pull-down circuit 303 turn on/off according to the impedance control signal DRZQN (00001), thereby determining the potential at the contact point A.

In response to the impedance control signal DRZQN (00001), the transistor 501 of the pull-down circuit 303 is set to the on state while the transistors 502, 503, 504, and 505 are set to the off state. Since the size of the transistor 501 is W/L as the minimal unit and thus provides only a small driving capability, the potential at the contact point A becomes slightly lower than the supply potential VDD. Since the potential at the contact point A is still higher than the reference potential Vref, the output COMP2 of the comparator 307 is held high and, therefore, the counter 305 further counts up and outputs a bit signal DRZQIN (00010).

The bit signal DRZQIN (00010) and the mask signal DRZQNIT from the counter 305 are input into the control circuit 311. During the transition period when the bit signal DRZQIN changes from (00001) to (00010), the mask signal DRZQNIT is set to low level and thus the impedance control signals DRZQN1 to DRZQN5 all become low. In this low-level period, all the transistors of the pull-down circuit 303 are in the off state and therefore the potential at the contact point A is once returned to the supply potential VDD (i.e. restored to the initial setting) Then, the mask signal DRZQNIT is set to high level, so that the bit signal DRZQIN (00010) is output as an impedance control signal DRZQN (00010) from the control circuit 311.

The time during which the mask signal DRZQNIT is held low can be optionally determined, but should be long enough to cancel noise that would otherwise be generated due to the shift in level of the bit signals DRZQIN1 to DRZQIN5. The cycle of the mask signal DRZQNIT is the same as the cycle in which the bit signals DRZQIN1 to DRZQIN5 are shifted in level. That is, the cycle of the mask signal DRZQNIT is synchronized with the cycle of the count operation, i.e. the count-up operation or the count-down operation.

The transistor 502 of the pull-down circuit 303 input with the impedance control signal DRZQN (00010) is set to the on state While the transistors 501, 503, 504, and 505 are set to the off state. The size of the transistor 502 is 2 W/L and, therefore, the potential at the contact point A becomes lower than that in the state of the bit signal DRZQIN (00001), but is higher than the reference potential Vref. Accordingly, the output COMP2 of the comparator 307 is held high and, therefore, the counter 305 further counts up and outputs a bit signal DRZQIN (00011).

By repeating these operations in sequence, the counter 305 continues counting up and, thus, the transistors of the pull-down circuit 303 turn on in order according to a count number so as to increase the total driving capability of the transistors of the pull-down circuit 303. As shown in FIG. 9, as the count operation proceeds, the impedance of the pull-down circuit 303 gradually decreases and hence the potential at the contact point A gradually decreases while once rising to the supply potential level on every occurrence of the count operation.

When, by further repeating counting up, the current driving capability of the transistors increases and the potential at the contact point A becomes smaller than the reference potential Vref, the output of the comparator 307 becomes low and hence the counter 305 counts down. In this manner, depending on magnitudes of the potential at the contact point A and the reference potential Vref, the output of the comparator 307 becomes high or low and thus the counter 305 counts up or down. As a result, the potential at the contact point A is stabilized around the reference potential Vref (=VDD/2).

When the potential at the contact point A is stabilized around the reference potential Vref (=VDD/2), the act signal ACT2 is inactivated. In response to the inactivation of the act signal ACT2, the counter 305 stops its count operation and fixes its count value. Further, since the levels of the impedance control signals DRZQN1 to DRZQN5 are finalized, the impedance adjustment of the pull-down circuit is completed. The act signal ACT2 is inactivated and all are fixed.

When the act signal ACT1 is activated, the impedance of each of the pull-up circuits 301 and 302 is calibrated so as to be equal to that of the external resistor R and is fixed. Further, when the act signal ACT2 is activated, the impedance of the pull-down circuit 303 is also fixed to that of the pull-up circuit 302. As a result, the impedance of each of the pull-up circuits 301 and 302 and the pull-down circuit 303 is set equal to that of the external resistor R. Using the impedance control signals DRZQP and DRZQN as control signals for the load side and the driver side of the output circuit, the impedance of the output circuit is adjusted. There is obtained a semiconductor device having the impedance-matched output circuit and thus capable of high-speed data transfer.

The calibration circuit of this invention comprises the impedance adjusting transistors and once inactivates the impedance adjusting transistors on every occasion of changing an impedance adjusting code. After restoring the potential to the initially set potential by once inactivating the impedance adjusting transistors, the state of the transistors is switched according to the impedance adjusting code.

As a result, (1) by once turning off the transistors, the potential at the calibration pin ZQ and the potential at the contact point A each always change in one direction, and further, (2) the set impedance becomes greater than or approximately equal to that of the external resistor in the pull-up circuit (or the pull-down circuit). Therefore, overshoot or undershoot cannot occur by overcoming the impedance of the external resistor. Since the noise is not generated as described above, the comparators always carry out stable comparison and judgment and thus there is obtained the calibration circuit that ensures stable outputs. There is obtained the semiconductor device comprising such a calibration circuit and thus capable of high-speed data transfer.

While the preferred embodiment of this invention has been described in detail, this invention is not to be limited thereto, but can be carried out with various changes without departing from the gist of this invention and those various changes are naturally included in this invention.

For example, the pull-up circuits 301 and 302 and the pull-down circuit 303 are provided in the foregoing embodiment. However, it is possible to provide only the pull-up circuit 301 and carry out calibration of the impedance only on the load side at the final stage of the output circuit. Conversely, it is possible to connect the external resistor R to the supply potential, use a pull-down circuit instead of the pull-up circuit 301, and carry out calibration of the impedance only on the driver side at the final stage of the output circuit.

What is claimed is:

1. A calibration circuit comprising
    a replica circuit connected to a calibration terminal,
    a comparator which compares a potential at said calibration terminal and a reference potential,
    a counter which performs a count operation in response to an output of said comparator, and
    a control circuit which outputs an impedance control signal in response to a count output and a mask signal from said counter, said impedance control signal used for controlling an impedance of said replica circuit,
    wherein said impedance control signal is set to an initial state to inactivate said replica circuit by said mask signal during a transition of said count output.

2. A calibration circuit according to claim 1, wherein said replica circuit comprises a plurality of transistors connected in parallel with each other, and
    wherein said impedance control signal is input to the gates of said plurality of transistors to control the on/off states of each of said plurality of resistors, thereby controlling the impedance of said replica circuit.

3. A calibration circuit according to claim 2, wherein said replica circuit has substantially a same structure as a structure on a load side at a final stage of an output circuit and is interposed between said calibration terminal and a supply potential.

4. A calibration circuit according to claim 2, wherein said replica circuit has substantially a same structure as a structure on a driver side at a final stage of an output circuit and is interposed between a circuit node having a same potential as said calibration terminal and a ground potential.

5. A calibration circuit according to claim 2, wherein said counter asserts said mask signal to cause said impedance control signal to inactivate said plurality of transistors during a transition of said counter output.

6. A calibration circuit according to claim 5, wherein said counter maintains said count output when said mask signal is de-asserted.

7. A calibration circuit according to claim 1, wherein said replica circuit includes a pull-up circuit connected between a supply potential and said calibration terminal.

8. A calibration circuit according to claim 7, further comprising
    a second pull-up circuit receiving said impedance control signal,
    a pull-down circuit,
    a second comparator which compares a potential at a contact point between said second pull-up circuit and said pull-down circuit and the reference potential,
    a second counter which performs a count operation in response to an output of said second comparator, and
    a second control circuit which outputs a second impedance control signal in response to a second count output and a second mask signal from said second counter, said second impedance control signal used for controlling impedance of said pull-down circuit,
    wherein said second impedance control signal is set to an initial state by said second mask signal when said second count output changes.

9. A calibration circuit according to claim 8, wherein said second pull-up circuit has substantially a same structure as a structure on a load side at a final stage of an output circuit and is interposed between one end of said pull-down circuit and the supply potential.

10. A calibration circuit according to claim 8, wherein said pull-down circuit has substantially a same structure as a structure on a driver side at a final stage of an output circuit and is interposed between one end of said second pull-up circuit and a ground potential.

11. A calibration circuit according to claim 7, wherein said pull-up circuit has substantially a same structure as a structure on a load side at a final stage of an output circuit and is interposed between said calibration terminal and the supply potential.

12. A semiconductor device comprising a calibration circuit including:
    a replica circuit connected to a calibration terminal,
    a comparator which compares a potential at said calibration terminal and a reference potential,
    a counter which performs a count operation in response to an output of said comparator, and
    a control circuit which outputs an impedance control signal in response to a count output and a mask signal from said counter, said impedance control signal used for controlling impedance of said replica circuit,
    wherein said impedance control signal is set to an initial state to inactivate said replica circuit by said mask signal during a transition of said count output.

13. A semiconductor device according to claim 12, wherein said replica circuit comprises a plurality of transistors connected in parallel with each other, and
    wherein said impedance control signal is input to the gates of said plurality of transistors to control the on/off states of each of said plurality of transistors, thereby controlling the impedance of said replica circuit.

14. A semiconductor device according to claim 13, wherein said replica circuit has substantially a same structure as a structure on a load side at a final stage of an output circuit and is interposed between said calibration terminal and a supply potential.

15. A semiconductor device according to claim 13, wherein said replica circuit has substantially a same structure as a structure on a driver side at a final stage of an output circuit and is interposed between a circuit node having a same potential as said calibration terminal and a ground potential.

16. A semiconductor device according to claim 13, wherein said counter asserts said mask signal to cause said impedance control signal to inactivate said plurality of transistors during a transition of said counter output.

17. A semiconductor device according to claim 16, wherein said counter maintains said count output when said mask signal is de-asserted.

18. A calibration circuit according to claim 12, wherein said replica circuit includes a pull-up circuit connected between a supply potential and said calibration terminal.

19. A calibration circuit according to claim 18, further comprising
    a second pull-up circuit receiving said impedance control signal,
    a pull-down circuit,
    a second comparator which compares a potential at a contact point between said second pull-up circuit and said pull-down circuit and the reference potential,
    a second counter which performs a count operation in response to an output of said second comparator, and a second control circuit which outputs a second impedance control signal in response to a second count output and a second mask signal from said second counter, said second impedance control signal used for controlling impedance of said pull-down circuit, wherein said second impedance control signal is set to an initial state by said second mask signal when said second count output changes.

20. A calibration circuit according to claim 19, wherein said second pull-up circuit has substantially a same structure as a structure on a load side at a final stage of an output circuit and is interposed between one end of said pull-down circuit and the supply potential.

21. A calibration circuit according to claim 19, wherein said pull-down circuit has substantially a same structure as a structure on a driver side at a final stage of an output circuit and is interposed between one end of said second pull-up circuit and a ground potential.

22. A calibration circuit according to claim 18, wherein said pull-up circuit has substantially a same structure as a structure on a load side at a final stage of an output circuit and is interposed between said calibration terminal and the supply potential.

23. A calibration circuit comprising:
 a replica circuit connected to a calibration terminal;
 a comparator which compares a potential at said calibration terminal and a reference potential;
 a counter which performs a count operation in response to an output of said comparator, produces a count output, and produces a mask signal during a transition of said count output; and
 a control circuit which outputs an impedance control signal in response to said count output, said impedance control signal used for controlling impedance of said replica circuit, the control circuit further sets said impedance control signal to an initial state in response to said mask signal.

24. The calibration circuit according to claim 23, wherein said replica circuit is inactivated by the initial state of the impedance control signal.

* * * * *